United States Patent [19]

Miller

[11] Patent Number: 4,764,872

[45] Date of Patent: Aug. 16, 1988

[54] VERTICAL FLIGHT PATH AND AIRSPEED CONTROL SYSTEM FOR AIRCRAFT

[75] Inventor: Harry Miller, Scottsdale, Ariz.

[73] Assignee: Honeywell Inc., Minneapolis, Minn.

[21] Appl. No.: 886,127

[22] Filed: Jul. 16, 1986

[51] Int. Cl.[4] .............................................. B64C 13/00
[52] U.S. Cl. ................................... 364/433; 364/434; 244/181; 244/182
[58] Field of Search ................ 364/433, 434; 244/180, 244/181, 182

[56] References Cited

U.S. PATENT DOCUMENTS

| | | | |
|---|---|---|---|
| 3,618,878 | 11/1971 | Klein et al. | 244/181 |
| 3,691,356 | 9/1972 | Miller | 244/182 |
| 3,901,466 | 8/1975 | Lambregts | 244/182 |
| 3,945,593 | 3/1976 | Schänzer | 244/181 |
| 3,981,442 | 9/1976 | Smith | 244/182 |
| 4,471,439 | 9/1984 | Robbins et al. | 364/433 |
| 4,488,235 | 12/1984 | Miller | 364/433 |
| 4,490,793 | 12/1984 | Miller | 364/433 |
| 4,536,843 | 8/1985 | Lambregts | 364/434 |
| 4,641,268 | 2/1987 | Zweifel et al. | 364/433 |

Primary Examiner—Gary Chin
Attorney, Agent, or Firm—Seymour Levine; Albin Medved

[57] ABSTRACT

An aircraft control system that simultaneously controls vertical speed (or flight path angle) and airspeed or Mach number by supplying the vertical speed (or flight path angle) command to the autothrottle system and the airspeed or Mach command to the autopilot pitch channel. A thrust reference computer provides an approximation of the thrust required to maintain the reference vertical speed (or flight path angle) and a vertical speed error signal in closed loop fashion provides a vernier adjustment to the approximation to provide the autothrottle channel command.

13 Claims, 5 Drawing Sheets

VERTICAL FLIGHT PATH AND AIRSPEED CONTROL SYSTEM FOR AIRCRAFT

BACKGROUND OF THE INVENTION

1. Field of the Invention

The present invention relates to automatic aircraft control systems including autopilot and autothrottle channels, particularly with respect to simultaneously controlling vertical speed or flight path angle and airspeed or Mach.

2. Description of the Prior Art

Present day automatic aircraft control system perform simultaneous control of vertical speed (or flight path angle) and airspeed (or Mach) by utilizing the pitch channel of the autopilot to control vertical speed or flight path angle and the autothrottle channel to control airspeed or Mach. Such prior art automatic flight control systems have the problem that an excessive vertical climb speed command or flight path angle command may result in a decrease of airspeed to an unsafe value.

Present day autothrottle systems are conventionally equipped with apparatus to limit the control authority of the throttles to prevent overboosting and consequently damaging the engines. Modern autopilot systems include apparatus that limits the pitch attitude attainable by the aircraft to prevent overstressing the airframe and causing discomfort to the passengers. The prior art automatic flight control systems of the type described have an insidious characteristic whereby a vertical climb speed or flight path angle that is reasonable and achievable at low altitudes will become excessive as the aircraft climbs because the thrust capability of the engines decreases as the aircraft altitude increases and the throttles eventually attain the built-in authority limit as the autothrottle channel endeavors to maintain the airspeed command. When the throttles attain the upper limited value, the airspeed cannot be maintained and begins to decrease as the autopilot endeavors to maintain the vertical speed or flight path angle by increasing the pitch attitude of the aircraft until the autopilot attains the built-in pitch limit. Consequently, in such prior art automatic flight control systems under such conditions, neither the vertical speed (or flight path angle) nor the airspeed (or Mach) remains under control and both values decrease. These dangerous conditions are exacerbated because of the increased drag resulting from the high angle of attack of the aircraft that is induced by a large pitch attitude.

Additionally, such prior art automatic flight control systems are prone to providing an unsafe and uncontrolled descent airspeed when the throttles contact the flight idle position if an unreasonably large descent vertical speed or flight path angle is commanded.

SUMMARY OF THE INVENTION

The above disadvantages of the prior art are overcome by an automatic aircraft control system that simultaneously utilizes the throttle and pitch controls to ensure a safe and efficient climb and descent Mach shcedule while maintaining a selected vertical speed or flight path angle. The selected vertical speed or flight path angle command is supplied to the engine automatic throttle controls and the selected airspeed or Mach command is simultaneously supplied to the pitch control channel of the automatic flight control system resulting in throttle movement and pitch attitude which are limited safely when an excessive vertical climb speed or vertical flight path angle is commanded without resulting in an unsafe loss in airspeed. The invention also provides a safe and limited vertical descent speed or flight path angle without resulting in an uncontrolled descent airspeed when the throttles contact the flight idle position if an unreasonably large descent vertical speed or flight path angle is commanded. The selected vertical speed or flight path angle is maintained until the engines attain maximum rated thrust for the existing ambient conditions, whereupon the vertical speed or flight path angle automatically decreases to a value consistent with the thrust coapability of the aircraft and the engines. The desired airspeed or Mach schedule is maintained at a safe value by operation of the elevators through the pitch channel of the automatic flight control system.

The thrust signal representative of the thrust required to maintain the vertical speed or flight path angle is generated from aerodynamic relationships and adjusted by closed loop feedback to ensure stable and accurate control of vertical speed or flight path angle.

DESCRIPTION OF THE PREFERRED EMBODIMENT

Figure 1:
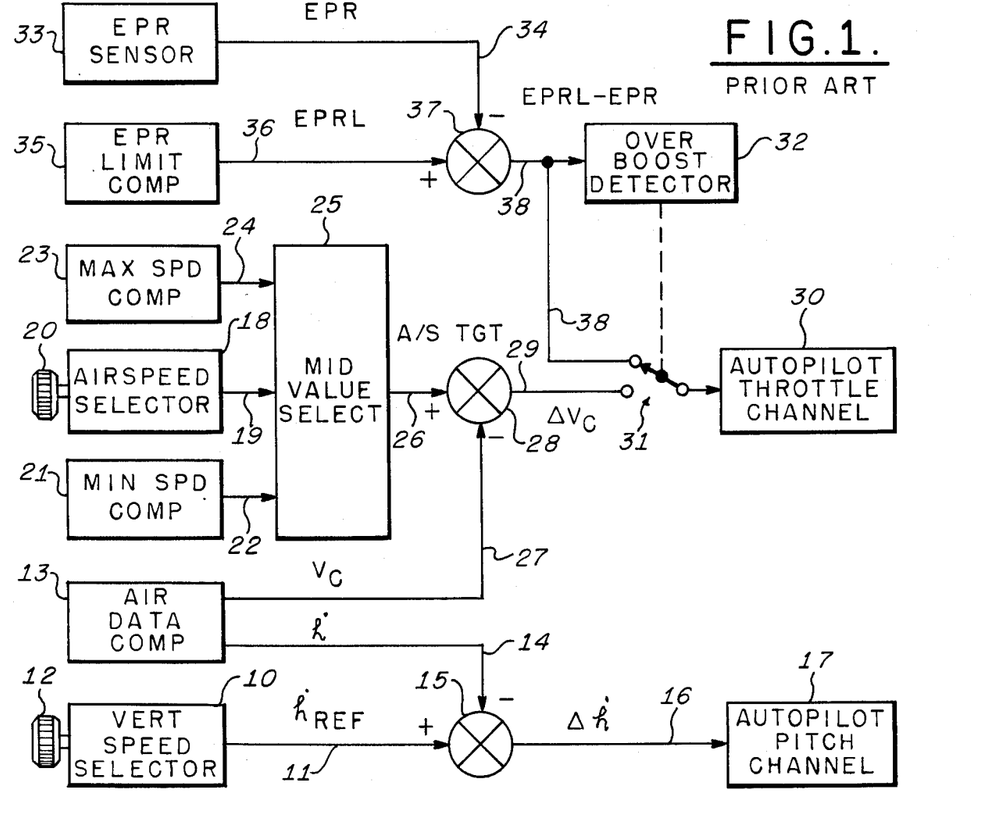
FIG. 1 is a schematic block diagram of a prior art system for simultaneously controlling vertical speed and air speed.

Referring to FIG. 1, a prior art aircraft control system for simultaneously controlling vertical speed and airspeed embodying the functional deficiencies discussed above is illustrated. A vertical speed selector 10 provides a digital or analog signal $h_{REF}$ on a line 11 that is proportional to a selected reference vertical speed. The vertical speed selector 10 includes a wheel or knob 12 that may be manipulated by the pilot to select a reference vertical speed to which it is desired that the aircraft be controlled. An air data computer 13 provides a signal designated ḣ on a line 14 proportional to the actual vertical speed of the aircraft. The signals on the lines 11 and 14 are supplied to an algebraic summing device 15 to provide the difference therebetween on a line 16. The signal on the line 16 is a control signal designated Δh which is supplied to the pitch channel 17 of the aircraft autopilot.

The prior art apparatus of FIG. 1 includes an airspeed selector 18 that provides a digital or analog signal on a line 19 that is proportional to a selected reference airspeed to which it is desired that the aircraft be controlled. A minimum speed computer 21 is included for continually providing a signal on a line 22 proportional to the minimum allowable airspeed predicated on existing conditions such as margin above stall speed and the like. A maximum speed computer 23 is similarly included for providing a signal on a line 24 proportional to the maximum allowable airspeed predicated on existing conditions such as FAA regulations, engine and airframe limits and the like. The signals on the lines 19, 22 and 24 are applied to a mid-value selector 25 that selects the signal on the line 19, 22 or 24 having an amplitude intermediate the amplitude of the other two signals. The mid-value selector 25 applies the selected signal to an output line 26 thereof, which selected signal is designated the airspeed target signal (A/S TGT). The mid-value selector 25 assures that the airspeed target signal on the line 26 is limited to remain within the allowable speed envelope of the aircraft.

The air data computer 13 provides a signal designated as $V_C$ on a line 27 proportional to the actual airspeed of the aircraft. The airspeed target signal on the line 26 is compared to the actual airspeed signal on the line 27 in an algebraic summing device 28 to generate a control signal designated $\Delta V_C$ on a line 29. The control signal on the line 29 is supplied to the autothrottle control channel 30 of the aircraft through a relay 31 of an overboost detector 32. An Engine Pressure Ratio (EPR) sensor 33 provides an EPR signal on a line 34 proportional to the actual engine EPR. An EPR limit computer 35 provides a signal on a line 36 proportional to the maximum EPR at which the engines can safely operate under existing ambient temperature, atmospheric pressure and the like as established by the engine and aircraft manufacturers. The EPR limit sensor 33 and the EPR limit computer 35 are conventional devices discussed in greater detail in U.S. Pat. No. 4,110,605 entitled "Weight and Balance Computer Apparatus for Aircraft" issued Aug. 29, 1978 in the name of the present inventor and in U.S. Pat. No. 4,488,235 entitled "Speed Control System for Aircraft" issued Dec. 11, 1984 in the name of the present inventor.

The EPR limit signal on the line 36 and the actual EPR signal on the line 34 are applied to an algebraic summing device 37 to provide the difference therebetween on a line 38. The EPR difference signal on the line 38 is applied to the overboost detector 32 as well as to a contact of the relay 31. When engine EPR is below the limit, the signal on the line 38 is positive. When the engine is overboosted whereby the EPR thereof exceeds the EPR limit signal on the line 36, the signal on the line 38 becomes negative. When the engine is within limits, the overboost detector 32 positions the relay 31 to the contact as illustrated in FIG. 1. When, however, the engine EPR exceeds the EPR limit, the change in polarity of the signal on the line 38 causes the overboost detector 32 to switch the relay 31 from the line 29 to the line 38. Thus, the overboost detector 32 determines when the allowable authority of the engine is being eceeded.

When the EPR signal on the line 34 is less than the EPR limit signal on the line 36, the autothrottle channel 30 controls the engine to maintain the target airspeed on the line 26. When, however, the EPR signal on the line 34 exceeds the EPR limit on the line 36, the autothrottle channel 30 is disconnected from the airspeed control signal on the line 29 and is operative to control the engine to maintain the allowable EPR limit on the line 36. Thus, when the engine EPR limit is exceeded, the system no longer reacts to constrain the airspeed to remain within the allowable airspeed envelope of the aircraft. The autopilot pitch channel 17 will unsuccessfully endeavor to maintain the vertical speed provided by the vertical speed selector 10 by increasing the angle of attack. This results in a loss in airspeed which can diminish to a value outside the speed envelope of the aircraft because of the ineffectiveness of the autothrottle channel 30 to control the airspeed. Thus, a dangerous situation is precipitated in which neither commanded airspeed nor commanded vertical speed is maintained. Additionally, during vertical descent when the throttles are in the flight idle position, a dangerous uncontrolled airspeed may result when an unreasonably large descent vertical speed or flight path angle is commanded.

Figure 2:
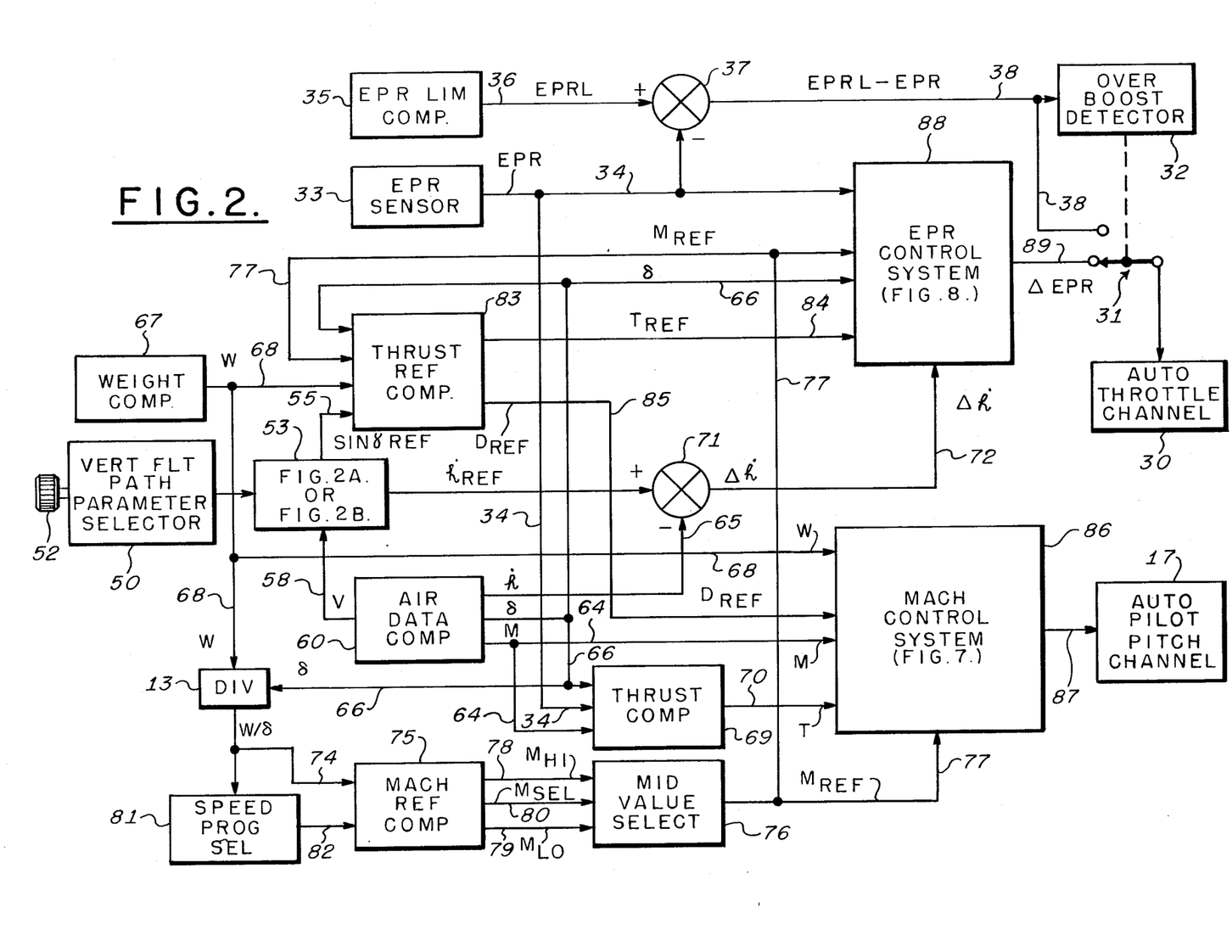
FIG. 2 is a schematic block diagram of a system in accordance with the invention for simultaneously controlling vertical speed or flight path angle and airspeed or Mach.
Figures 2A, 2B:
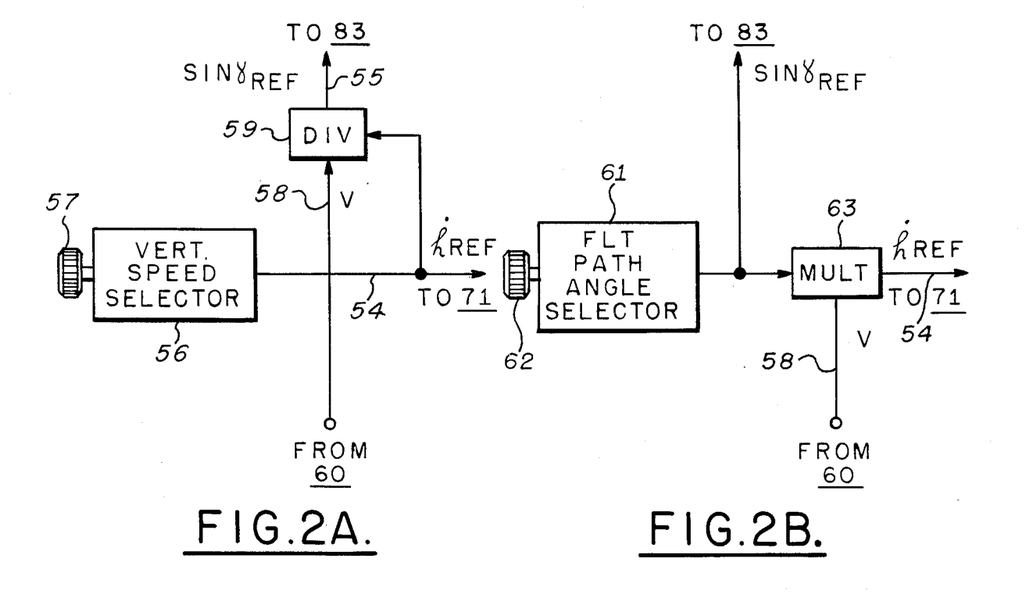
FIGS. 2a and 2b are schematic block diagram sof details of FIG. 2 for controlling vertical speed or flight path angle, respectively.

Referring to FIGS. 2, 2a and 2b, in which like reference numerals indicate like components with respect to FIG. 1, a schematic block diagram of an aircraft control system in accordance with the invention for simultaneously controlling a vertical flight path parameter such as vertical speed or flight path angle and Mach number or air speed is illustrated. A vertical flight path parameter selector 50 provides a digital or analog signal on a line 51 that is proportional to a selected reference vertical flight path parameter. The vertical flight path parameter selector 50 includes a wheel or knob 52 that may be manipulated by the pilot to select a reference vertical flight path parameter to which it is desired that the aircraft be controlled. In accordance with the embodiment of the invention, the reference vertical flight path parameter is either vertical speed or flight path angle.

The vertical flight path parameter reference signal on the line 51 is applied to a block 53 designated as FIG. 2a or FIG. 2b. When the system of FIG. 2 controls to vertical speed, the apparatus of FIG. 2a is utilized in the block 53. When the system controls to flight path angle, the apparatus of FIG. 2b is utilized therein. Irrespective of whether vertical speed or flight path angle is utilized, the block 53 provides a reference vertical speed signal $h_{REF}$ on a line 54 and a reference flight path angle signal $\sin \gamma_{REF}$ on a line 55.

Referirng to FIGS. 2a and 2b, in which like reference numerals indicate like components with respect to FIG. 2, when the system of FIG. 2 controls to vertical speed, the vertical flight path parameter selector 50 and wheel 52 are implemented by a vertical speed selector 56 and a wheel 57 as illustrated in FIG. 2a. The vertical speed selector 56 provides the vertical speed reference signal on the line 54 in the manner described above with respect to the vertical speed selector 10 of FIG. 1. The sin $\gamma_{REF}$ signal on the line 55 is generated by dividing the vertical speed reference signal on the line 54 by a true airspeed signal V on a line 58 by means of a conventional digital or analog divider 59. The true airspeed signal on the line 58 is provided by a conventional air data coputer 60 as illustrated in FIG. 2.

When the system of FIG. 2 controls to a selected flight path angle, the vertical flight path parameter selector 50 and the wheel 52 are implemented by a flight path angle selector 61 and a wheel 62 as illustrated in FIG. 2b. The flight path angle selector 61 directly generates the sin $\gamma_{REF}$ signal on the line 55 and generates the vertical speed reference signal on the line 54 via a conventional digital or analog multiplier 63. The multiplier 63 multiples the flight path angle reference signal on the line 55 by the true airspeed signal on the line 58 to provide the airspeed reference signal on the line 54.

The circuits of FIGS. 2a and 2b utilize the relationship $$\sin \gamma_{REF} = \dot{h}_{REF}/V \quad (1)$$

in converting between the vertical speed and the flight path angle reference signals. It is appreciated that when the system of FIG. 2 controls to a desired vertical speed, the desired vertical speed reference signal is selected by the wheel 57 of FIG. 2a. When the system of FIG. 2 controls to flight path angle, the desired flight path angle is selected by the wheel 62 of FIG. 2b.

With continued reference to FIG. 2, the embodiment of the present invention illustrated therein includes the conventional air data computer 60 that provides the true airspeed signal V on the line 58 as described above. The air data computer 60 also provides a signal M on a line 64 proportional to the actual Mach number of the aircraft and further provides, a signal $\dot{h}$ on a line 65 proportional to the actual vertical speed of the aircraft. The air data computer 60 additionally provides a signal $\delta$ on a line 66 proportional to the static pressure ratio which is the ratio between existing static pressure surrounding the aircraft and a reference pressure which typically is the international standard static pressure at means seal level.

The system of FIG. 2 includes a weight computer 67 that provides a signal W on a line 68 representative of the current aircraft weight. The weight computer 67 may be of any conventional type such as that disclosed in U.S. Pat. No. 4,494,210 entitled "Enroute Weight Computer for Aircraft" issued Jan. 15, 1985 in the name of the present inventor. Alternatively, the weight computer 67 may be implemented in the manner described in said U.S. Pat. No. 4,110,605.

Figure 3:
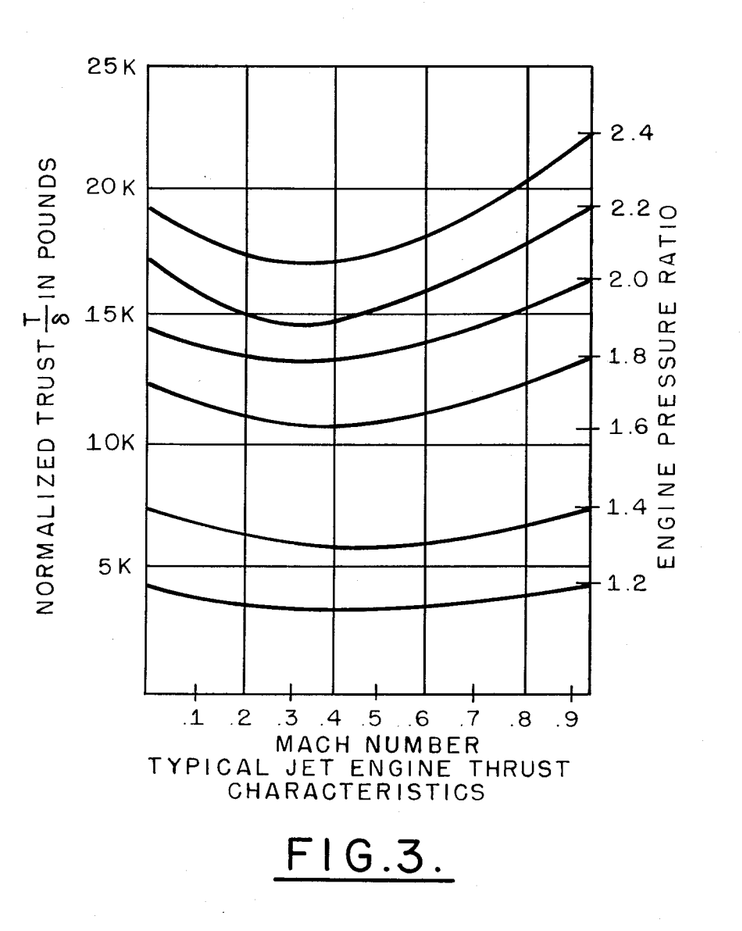
FIG. 3 is a graph illustrating the engine pressure ratio (EPR) required to generate a target thrust at a desired Mach number for one engine of a type utilized in typical jet transport aircraft.

The apparatus of FIG. 2 includes the components 30-38 that are structurally and functionally identical to the similarly designated components described above with respect to FIG. 1. The system of FIG. 2 includes a thrust computer 69 responsive to the EPR signal on the line 34, the Mach signal on the line 64 and the static pressure ratio signal on the line 66 for providing a signal T on a line 70 proportional to the thrust delivered by the jet engines of the aircraft. The thrust computer 69 may be of the type disclosed in said U.S. Pat. No. 4,110,605 representing an implementation of the thrust characteristics illustrated in FIG. 3. FIG. 3 provides curves wherein the thrust generated by a typical jet engine is a function of Mach number, EPR and the static pressure ratio $\delta$. The data illustrated graphically in FIG. 3 is characteristic of typical narrow-body jet transports and is stored in the thrust computer 69, in for example, ROM or PROM. The thrust computer 69, implements the characteristics illustrated in FIG. 3 preferably utilizing well-known digital curve fitting techniques. The characteistic data may be stored in a non-volatile memory addressed conventionally by the Mach number on the line 64 and the EPR value on the line 34 to derive the corresponding normalized thrust signal T/$\delta$. The thrust computer 69 multiplies the so derived normalized thrust signal by the value of $\delta$ on the line 66 and multiplies by the number of engines to provide the thrust output on the line 70. The conventional curve fitting techniques utilized to store the data represented in FIG. 3, reflect a polynomial fit of the thrust characteristics illustrated. The polynomial coefficients are derived and stored in a conventional manner in the thrust computer 69 for generating the normalized thrust signal T/$\delta$. It is appreciated by those skilled in the digital computer art that precise engine polynomial coefficients defined by the curves of FIG. 3 may be stored in ROM or PROM to provide the normalized thrust signal. Alternatively, tabular data coresponding to the curves of FIG. 3 may be stored in memory for addressing by the signals on the lines 34 and 64 to provide the normalized thrust signal. The characteristics illustrated in FIG. 3 are provided by the engine and aircraft manufacturers. Alternatively the engine anad aircraft manufacturers may provide the tabular data or the polynomial coefficients that may be stored in the thrust computer 69 so as to provide the normalized thrust signal in accordance with the curves of FIG. 3. The normalized thrust signal is multiplied by $\delta$ in the thrust computer 69 to provide the thrust signal T on the line 70.

It is appreciated that the thrust computer 69 may alternatively be implemented to generate the thrust signal T as a function of the speed of one of the jet engine rotors ($N_1$) rather than EPR since some engine manufacturers prefer to express thrust generated as a function of $N_1$. The thrust computer 69 would accordingly be modified to reflect the $N_1$) engine type characteristics by utilizing the Mach number input on the line 64, the static pressure ratio input on the line 66, an input from a conventional $N_1$ sensor (not shown) and a total air temperature (TAT) input at the engine inlet from a conventional total temperature probe. Suitable $N_1$ characteristics for implementing the thrust computer 69 are illustrated in FIG. 4 of said U.S. Pat. No. 4,110,605.

The $\dot{h}_{REF}$ signal on the line 54 from the block 53 and the $\dot{h}$ signal on the line 65 from the air data computer 60 are applied to an algebraic summing device 71 to provide a vertical speed error signal, designated $\Delta \dot{h}$, on a line 72. The vertical speed error signal on thel ine 72 is utilized, via the autothrottle channel 30, in controlling the vertical flight path parameter provided by the vertical flight path parameter selector 50 in a manner to be described. The system of FIG. 2 further includes a conventional divider 73 for dividing the weight signal on the line 68 by the static pressure ratio signal on the line 66, by conventional digital division computations, to provide a signal on a line 74 designated as W/$\delta$. The signal on the line 74 is utilized in the Mach control section of the apparatus in a manner to be described.

The system of FIG. 2 includes a Mach reference computer 75 and a mid-value selector 76 which provides a Mach reference signal $M_{REF}$ on a line 77. The Mach reference signal on the line 77 is generated in a manner similar to that described in U.S. Pat. No. 4,488,235 entitled "Speed Control System for Aircraft" issued Dec. 11, 1984; U.S. Pat. No. 4,490,793 entitled "Cruise Speed Control for Aircraft Performance Management System" issued Dec. 25, 1984 and U.S. patent application Ser. No. 461,357, entitled "Cruise Airspeed Control for Aircraft" filed Jan. 27, 1983; all in the name of the present inventor. The mid-value selector 76 functions in a manner similar to that described above with respect to the mid-value selector 25 of FIG. 1. The Mach reference computer 75 provides, to the mid-value selector 76, high and low Mach limit signals on lines 78 and 79 respectively. These signals are designated respectively as $M_{HI}$ or $M_{LO}$. The Mach reference computer 75 also provides a Mach signal designated $M_{SEL}$ on a line 80 to the mid-value selector 76. A speed program selector 81 is utilized to implement desired Mach climb schedules, in a manner to be described, to provide the desired program Mach number as an input to the Mach reference computer 75 on a line 82. The $W/\delta$ signal on the line 74 is applied as an input to the Mach reference computer 75 and to the speed program selector 81 for reasons to be described.

Figure 4:
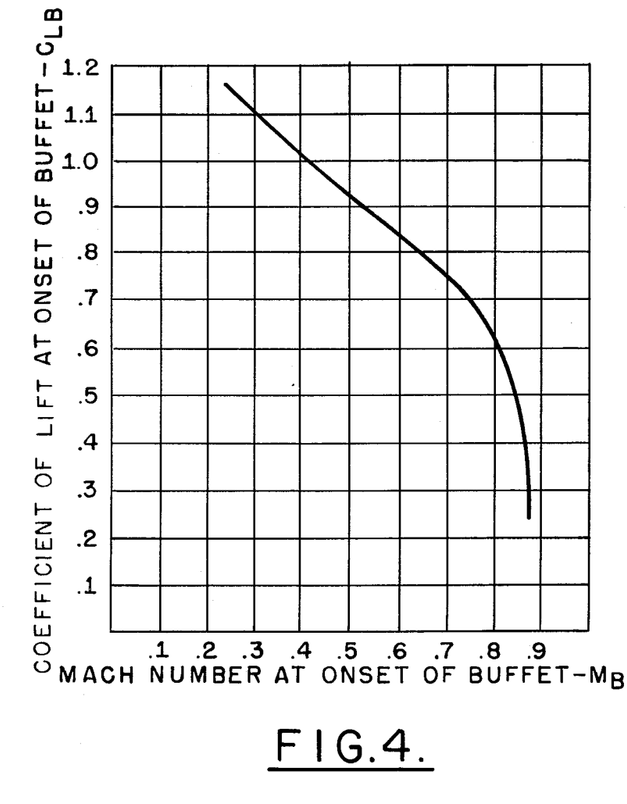
FIG. 4 is a graph illustrating the coefficent of lift at onset of buffet as a function of Mach number for a typical jet transport aircraft.
Figure 5:
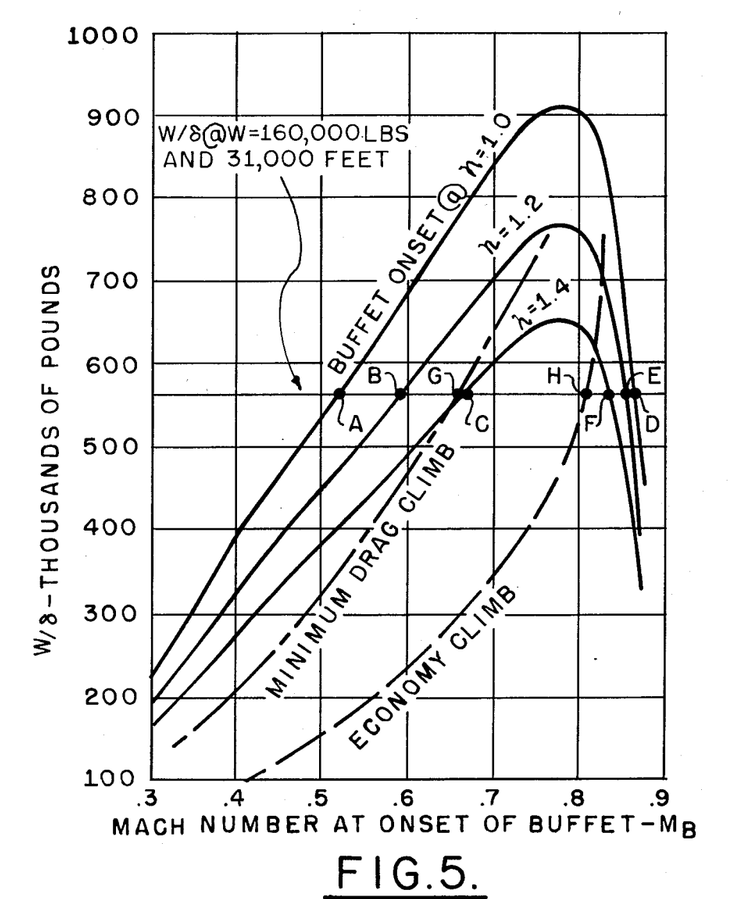
FIG. 5 is a graph illustrating a family of critical Mach chaacteristis of a typical jet transport aircraft as a function of weight and ambient static pressure.

Referring to FIGS. 4 and 5, characteristic data that is stored and utilized in the Mach reference computer 75 and the speed program selector 81 for a typical jet transport aircraft are illustrated. FIG. 4 illustrates the characteristic that determines the allowable speed envelope of the typical jet transport aircraft in its clean aerodynamic state representing the coefficient of lift at which buffet occurs as a function of Mach number.

The characteristic data of FIG. 4 is transformed into the data of FIG. 5 by utilizing the following relationship.

$$W/\delta = (K\, C_{LB} M_B^2)/\eta \text{ (thousands of pounds)} \quad (2)$$

Where:
$W$ = aircraft weight (thousands of pounds)
$\delta$ = static pressure ratio = $P_S/P_0$
$C_{LB}$ = Coefficient of lift at onset of buffet
$M_B$ = Mach number corresponding to onset of buffet
$\eta$ = load factor
$K$ = constant related to aircraft wing area typically $K$ = 2310.7 (thousands of pounds)
$P_S$ = static pressure (pounds per square foot - psf)
$P_0$ = standard static pressure = 2116 psf.

The load factor is the lift-to-weight ratio which in straight and level non-turbulent flight is equal to unity. The load factor differs from unity in turbulence and when the aircraft is maneuvering in pitch and roll. For example, the load factor is 1.4 during a steady blanked turn at a roll angle of 44.4 degrees.

Referring to FIG. 5, the solid line curves thereof represent the transformation of the characteristic data of FIG. 4 by means of equation 2 with respect to three selected load factors 1.0, 1.2, and 1.4. The solid line characteristics of FIG. 5 represent the buffet, onset boundries for the selected load factors as a function of $W/\delta$ and Mach number. FIG. 5 also depicts in dashed line curves two typically desired Mach climb schedules, namely, minimum drag climb and economy climb. These illustrated Mach climb schedules are also provided as functions of $W/\delta$ and Mach number at onset of buffet. The characteristics of FIG. 5 are utilized to determine the allowable Mach envelope for various load factors.

Referring again to FIG. 2 the solid line characteristic of FIG. 5 are stored in the Mach reference computer 75 int hemanner described above with respect to the thrust computer 69 and preferably by digital curve fitting techniques. The Mach reference computer 75 generates the high speed buffet Mach limit $M_{HI}$ on the line 78 and the low speed buffet Mach limit $M_{LO}$ on the line 79 by such digital curve fitting techniques with respect to the characteristics of FIG. 5 to reflect a specific load factor. The signal on the line 74 addresses the Mach reference computer 75 to provide the corresponding $M_{HI}$ and $M_{LO}$ signals in accordance witht he selected load factor. For example, as illustrated in FIG. 5, the intersection of the horizontal line, representing W = 160,000 lb. and an altitude of 31,000 feet with the solid line buffet onset curves provides the minimum and maximum Mach values $M_{LO}$ and $M_{HI}$. Accordingly, the minimum Mach values for load factors 1.0, 1.2 and 1.4 at an aircraft weight of 160,000 lb. and an altitude of 31,000 feet are provided by the Mach values corresponding to points A, B and C, respectivley. Similarly, the maximum Mach values are provided by points D, E and F, respectively. A load factor is selected that provides a buffet onset safety factor that is deemed appropriate. Typically a load factor of 1.3 is selected. It is appreciated that the load factor may not be a constant but can vary as a function of $W/\delta$.

The speed program selector 81 implements desired Mach climb schedules nt helne 82 such as constant Mach, constant calibrated airspeed and the minimum drag and economy climb schedules of FIG. 5. The characteristic data for the minimum drag climb and economy climb schedules is stored in the speed program selector in the manner described above with respect to the thrust computer 69. The Mach number to be provided as a control signal is addressed as a function of $W/\delta$ by the signal on the line 74. Pursuant to the example given above, the points G and H of FIG. 5 reflect the Mach values corresponding to the $W/\delta$ value discussed above for minimum drag climb and economy climb, respectively.

The output of the speed program selector 81 on the line 82 is applied to the Mach reference computer 75 for utilization therein in generating the Mach select signal $M_{SEL}$ on the line 80. For a constant Mach climb, a desired Mach number selected by the pilot via the spped program selector 81 is transmitted directly from the line 82 to the line 80. For a constant calibrated airspeed climb, a constant calibrated airspeed value selected by the pilot and appearing on the line 82 is applied to the Mach reference computer 75 wherein the constant calibrated airspeed signal is transformed, by conventional means, into the corresponding Mach number which is applied to the line 80. When operating in the minimum drag climb or economy climb modes, the Mach number appearing on the line 82 resulting from the $W/\delta$ signal on the line 74 is transmitted to the line 80 as the Mach select signal. The mid-value selector 76 assures that the $M_{REF}$ signal on the line 77 does not attain a magnitude that is outside the $M_{LO}$ and $M_{HI}$ envelope.

The Mach reference signal on the line 77 is applied as an input to a thrust reference computer 83. The thrust reference computer 83 also receives as inputs the reference flight path angle signal on the line 55, the static pressure ratio signal on the line 66 and the weight signal on the line 68. The thrust reference computer 83 provides a preliminary estimate of the thrust required to maintain the vertical speed, or alternatively the flight path angle, selected by the vertical flight path parameter selector 50 at the programmed Mach number $M_{REF}$ on the line 77. This thrust estimate, designated $T_{REF}$ is provided on a line 84 by the thrust reference computer 83. The thrust estimate $T_{REF}$ is refined utilizing the $\Delta h$ signal on the line 72 in a closed loop feedback configuration in a manner to be described. The thrust reference computer 83 additionally generates a reference drag signal, designated as $D_{REF}$, on a line 85 for use in the Mach control section of the system in a manner to be explained. The following analysis is utilized in the development of the implementation of the thrust reference computer 83.

Newton's second law of motion equates the net forces acting on the aircraft along its flight path with the product of the aircraft mass and the aircraft acceleration along the flight path. Accordingly:

$$T \cos \alpha - D - W \sin \gamma = (W/g)\dot{V} \quad (3)$$

Where
T=thrust
$\alpha$=angle of attach
D=drag
W=weight
$\gamma$=flight path angle
$\dot{V}$=acceleration along the flight path
g=acceleration of gravity
solving for T in equation 3:

$$T = \{D + W[(\dot{V}/g) + \sin \gamma]\}/\cos \alpha \quad (4)$$

An approximation of the thrust required to maintain a reference flight path angle, $\gamma_{REF}$, at a reference Mach number with a known altitude and weight is derived by assuming that $\alpha$ and $\dot{V}$ are both zero, resulting in the following relationship:

$$T_{REF} = D_{REF} + W \sin \gamma_{REF} \quad (5)$$

Figure 6:
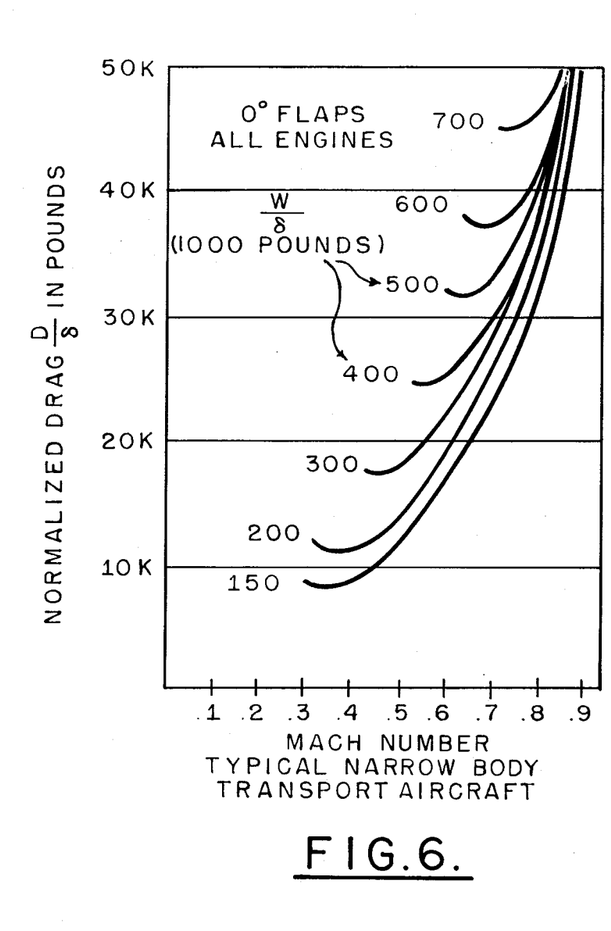
FIG. 6 is a graph illustrating the thrust required to overcome aircraft drag at a desired Mach number for a typical jet transport aircraft.

Where
$D_{REF}$=the anticipated drag of the aircraft when operating at the reference Mach number at the known weight and altitude Referring to FIG. 6, drag characteristics of a typical jet transport aircraft as functions of Mach number and W/$\delta$ are illustrated. The thrust reference computer 83 stores the characteristic data of FIG. 6 in the manner described above with respect to the thrust computer 69 and also stores equation 5 for providing the thrust reference signal on the line 84 and the drag reference signal on the line 85. Specificlaly, the thrust reference computer 83 includes conventional components for dividing the weight signal on the line 68 by the static pressure ratio signal on the line 66 to obtain a W/$\delta$ addressing signal. The W/$\delta$ addressing signal in combination with the Mach reference signal on the line 77 addresses the characteristic drag data stored therein to provide a normalized drag value D/$\delta$. The thrust reference computer 83 multiplies this normalized drag value by the static pressure ratio signal $\delta$ on the line 66 to provide the $D_{REF}$ signal on the line 85. The thrust reference computer 83 applies this $D_{REF}$ signal along with the W signal on the line 68 and the sin $\gamma_{REF}$ signal on the line 55 to equation 5 stored therein to provide the $T_{REF}$ signal on the line 84.

The system of FIG. 2 includes Mach control system 86 responsive to the reference Mach number signal on the line 77, the Mach signal on the line 64 from the air data computer 60, the weight signal on the line 68 from the weight computer 67, the thrust signal on the line 70 from the thrust computer 69 and the reference drag signal on the line 85 from the thrust reference computer 83. The Mach control system 86 provides a signal on a line 87 to the autopilot pitch channel 17 to control the pitch attitude of the aircraft to maintain the Mach reference signal on the line 77. A Mach control system suitable for implementing the Mach control system 86 is disclosed in said U.S. Pat. No. 4,488,235 wherein Mach control by elevator is described. Details of the Mach control system 86 will be further described herein with respect to FIG. 7.

The System of FIG. 2 includes an EPR control system 88 responsive to the EPR signal on the line 34 from the EPR sensor 33, the static pressure ratio signal on the line 66 from the air data computer 60, the $\Delta\dot{h}$ signal on the line 72, the Mach reference signal on the line 77 and the thrust reference signal on the line 84 from the thrust reference computer 83. In response to these input signals, the EPR control system 88 generates a signal $\Delta$EPR on a line 89 which is applied to the auto throttle channel 30 via the overboost detector relay 31 to provide sufficient engine thrust to maintain the vertical flight path parameter commanded by the vertifcal flight path parameter selector 50. When the system of FIG. 2 is controlling to vertical speed, the signal on the line 89 controls the autothrottle system 30 to provide sufficient engine thrust to maintain the selected vertical speed commanded by the vertical speed selector 56 (FIG. 2a). When the system of FIG. 2 is controlling to flight path angle, the signal on the line 89 controls the autothrottle system 30 to provide sufficient engine thrust to maintain the selected flight path angle commanded by the flight path angle selector 61 (FIG. 2b). The $T_{REF}$ estimate signal on the line 84 is refined in the EPR control system 88 utilizing the $\Delta\dot{h}$ signal on the line 72 as closed loop feedback to the ERP control system 88 in a manner to be described.

The signal to the autothrottle channel 30 will switch to the control signal on the line 38 through the overboost detector relay 31 to limit the output of the engines in a manner similar to that described above with respect to FIG. 1. When the relay 31 switches to the line 38, thus disconnecting the signal on the line 89 from control of the throttles, the aircraft is permitted to seek a vertical speed or flight path angle which is consistant with the thrust capability, altitude and weight of the aircraft while maintaining the Mach number reference on the line 77 at the input to the Mach control system 86. The EPR control system 88 utilizes several of the teachings of said U.S. Pat. No. 4,490,793 and said patent application Ser. No. 461,357 in a manner to be described. Details of the EPR control system 88 will be described below with respect to FIG. 8.

Figure 7:
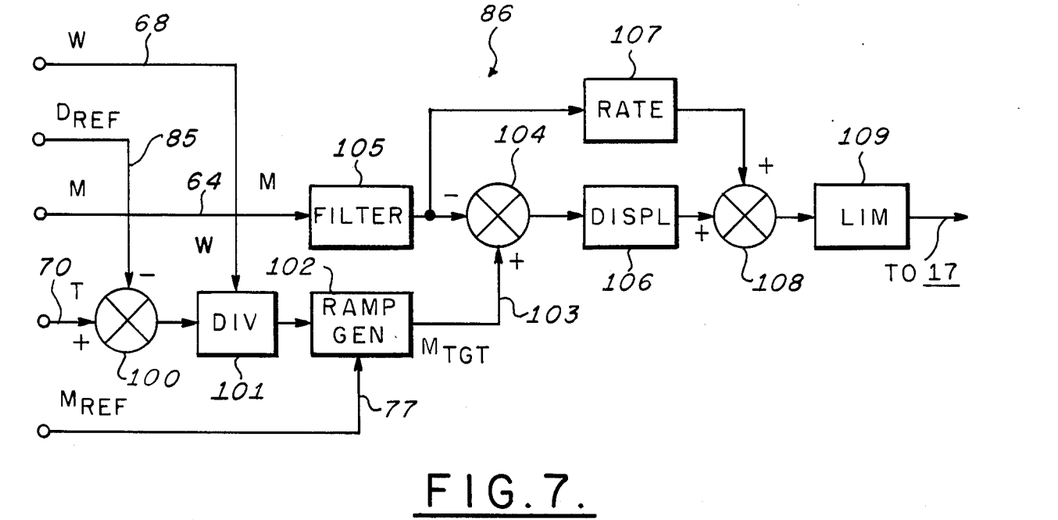
FIG. 7 is a schematic block diagram illustrating details of the Mach control system of FIG. 2.

Referring to FIG. 7, in which like reference numerals indicate like components with respect to FIG. 2, circuitry for implementing the Mach control system 86 of FIG. 2 is illustrated. As explained above, the structure and operation of the Mach control system 86 of FIG. 7 is disclosed and described in detail in said U.S. Pat. No. 4,488,235. Briefly, the Mach control system 86 utilizes the aircraft pitch controls 17 to attain the reference Mach number on the line 77 in a manner to ensure proper division between aircraft acceleration and rate of climb when an abrupt step change in the Mach reference is effected. This performance is obtained by converting the step change into a ramp command, the slope of which is directly proportional to the existing aircraft thrust minus drag and inversely proportional to the existing aircraft weight as described in said U.S. Pat. No. 4,488,235.

Specifically, the thrust signal on the line 70 and the reference drag signal on the line 85 are applied to an algebraic summing device 100 to provide the difference therebetween to a divider 101. The divider 101 is also responsive to the weight signal on the line 68 to provide a signal proportional to the thrust minus drag divided by weight to a ramp generator 102. The ramp generator 102 is responsive to the Mach reference signal on the line 77 to provide a Mach target signal, $M_{TGT}$, on a line 103 for the reasons described in detail in said U.S. Pat. No. 4,488,235. The Mach target signal on the line 103 is applied to an algebraic summing device 104 which also receives the Mach signal on the line 64 via a smoothing filter 105. The smoothed Mach signal is provided to the autopilot pitch channel 17 through the algebraic summing device 104 and a displacement gain adjustment block 106. In order to provide overall Mach control system stability, a Mach number rate signal is derived through rate taking block 107, the output of which being combined with the displacement signal from the block 106 in an algebraic summing device 108. For safety purposes and to prevent excessive pitch atitude commands to the autopilot pitch channel 17, the Mach signal is limited by a limiter 109.

Figure 8:
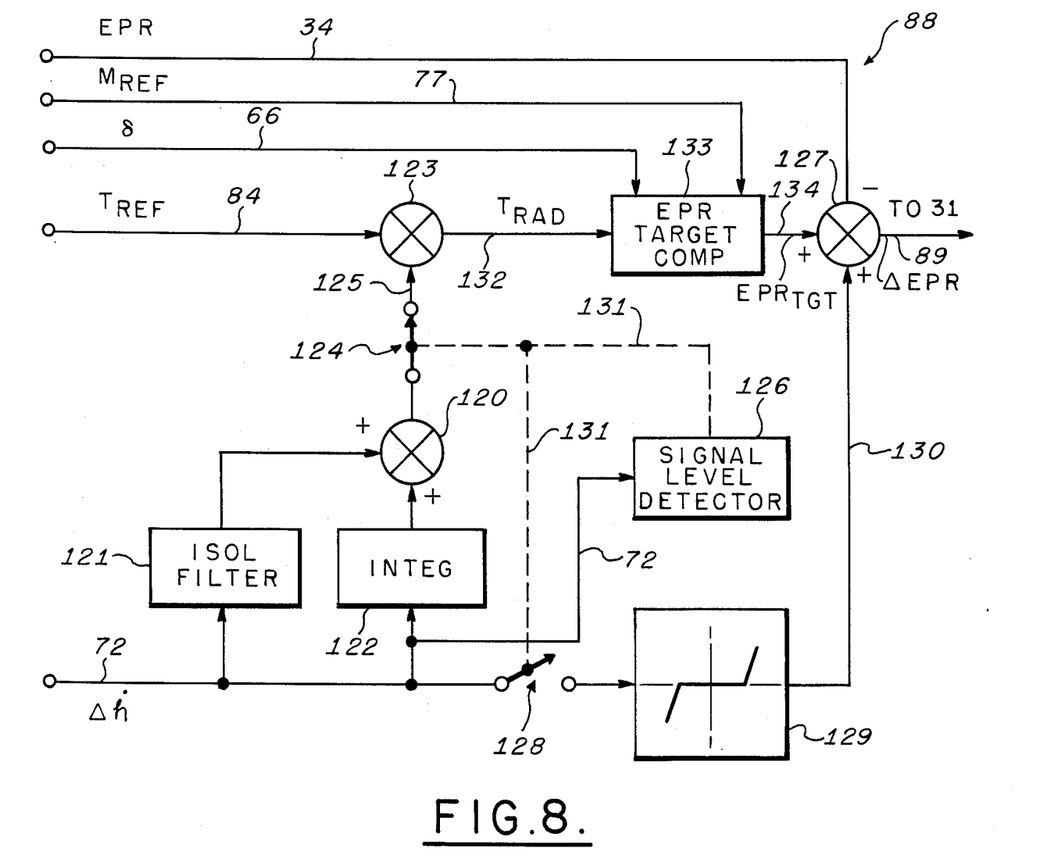
FIG. 8 is a schematic block diagram illustrating details of the EPR control system of FIG. 2.

Referring to FIG. 8, in which like reference numerals indicate like components with respect to FIG. 2, details of an implementation of the EPR control system 88 of FIG. 2 are illustrated. The $\Delta \dot{h}$ signal on the line 72 is applied to an algebraic summing device 120 via a low pass isolation filter 121 and an integrator 122. The output of the algebraic summing device 120 is applied as an input to an algebraic summing device 123 via a relay switch 124 and a line 125. The $\Delta \dot{h}$ signal on the line 72 is also applied as an input to a signal level detector 126 and as an input to an algebraic summing device 127 via a relay switch 128, a non-linear by-pass circuit 129 and a line 130. The non-linear gain characteristic of circuit 129 is illustrated within the block 129. The signal level detector 126 has a characteristic that is designed to match that of the non-linear by-pass circuit 129. When the magnitude of the $\Delta \dot{h}$ signal on the line 72 is within the flat range of the non-linar gain characteristic of the circuit 129, the signal level detector 126 controls the relay contacts 124 and 128 via a relay 131 to effect the connections as illustrated; vis., relay contact 124 closed and relay contact 128 open. When, however, the magnitude of the $\Delta \dot{h}$ signal on the line 72 exceeds the flat range of the non-linear gain characteristic of the circuit 129, the signal level detector 126 operates the relay contacts 124 and 128 to close the contact 128 and open the contact 124.

The $T_{REF}$ signal on the line 84 is applied as an input to the algebraic summing device 123 which in combination with the signal on the line 125 provides a required thrust signal $T_{RQD}$ on a line 132. The required thrust signal on the line 132, the Mach reference signal on the line 77 and the static pressure ratio signal on the line 66 are applied as inputs to an EPR target computer 133. The EPR target computer 133 converts the $T_{RQD}$ signal on the line 132 to an equivalent EPR target signal, $EPR_{TGT}$, on a line 134 in accordance with the characteristic data illustrated in FIG. 3. In a manner similar to that described above with respect to the thrust computer 69, the graphical data of FIG. 3 is stored in the EPR target computer 133 to be addressed by the Mach reference signal on the line 77 and the required thrust signal on the line 132 to provide the corresponding $EPR_{TGT}$ signal on the line 134. The EPR target computer 133 divides the $T_{RQD}$ signal on the line 132 by the static pressure ratio signal on the line 66 and utilizes this $T_{RQD}/\delta$ signal with the $M_{REF}$ signal on the line 77 to address the computer memory to provide the corresponding EPR pursuant to the characteristic data of FIG. 3. The EPR target computer 133 is implemented in a manner similar to that described in said U.S. Pat. No. 4,490,793.

The algebraic summing device 127 receives as inputs the by-pass signal on the line 130, the $EPR_{TGT}$ signal on the line 134 and the EPR signal on the line 34 to provide the $\Delta EPR$ signal on the line 89 that is applied via the overboost detector relay 31 to the autothrottle channel 30.

With continued reference to FIG. 8, the output $T_{REF}$ of the thrust reference computer 83 (FIG. 2) on the line 84 represents, as previously described, an approximation of the thrust required to maintain the selected vertical speed provided by the vertical speed selector 56 (FIG. 2a) or the selected flight path angle provided by the flight patha ngle selector 61 (FIG. 2b). This occurs because the thrust reference signal on the line 84 is predicated on nominal aircraft characteristics which vary with respect to aircraft of the same type and model and additionally because of the assumption made with respect to equation 4 above that the angle of attack and the forward acceleration are both zero. The $T_{REF}$ signal on the line 84 is accordingly adjusted to correct for these factors by the algebraic summing device 123 that provides the adjusted reference thrust signal $T_{RQD}$ on the line 132. The adjustment signal, which is applied to the algebraic summing device 123 on the line 125, represents the sum of the integration by the integrator 122 of the $\Delta \dot{h}$ signal on the line 72 and the output from the isolation filter 121. The isolation filter 121 is a low pass filter that minimizes dynamic interference between the Mach control system 86 and the EPR control system 88 in the manner described in said patent application Ser. No. 461,357. The isolation filter 121 provides frequency isolation between the Mach control system 86 and the EPR control system 88 by filering high frequency noise from the displacement component of the adjustment signal on the line 125 to prevent undesired high frequency movement of the throttles.

The signal level detector 126 together with the non-linear by-pass circuit 129 permits excessive $\Delta \dot{h}$ signal on the line 72 to by-pass the integral channel 122 and the isolation channel 121 thereby providing a rapid response to abrupt changes in the selected vertical speed or the selected flight path angle. When the signal level detector 126 opens the relay contact 124 and closes the relay contact 128, the output on the line 130 from the non-linear by-pass circuit 129 directly supplements the $\Delta EPR$ signal on the line 89 until the $\Delta \dot{h}$ signal on the line 72 diminishes in magnitude to within the flat range of the non-linear gain characteristic of the circuit 129. The $\Delta EPR$ signal on the line 89 represents a composite of the EPR target signal on the line 134, the actual EPR on the line 34 and the by-pass signal on the line 130.

It is appreciated that the present invention is applicable to configurations where the autothrottle channel 30 is comprised of independent servo channels for each of the engines of the aircraft. Such configurations are describd in said U.S. Pat. Nos. 4,488,235; 4,490,793 and in said patent application Ser. No. 461,357. Alternatively the invention is applicable to autothrottle channels utilizing a single throttle servo operating through ganged clutches to simultaneously control the multiple engines of the aircraft.

When configured for independent engine control, the EPR limit computer 35 of FIG. 2 provides a separate EPR limit signal for each of the engines. The embodiment also includes a separate EPR sensor 33, a separate algebraic summing device 37, a separate overboost detector 33 and a separate overboost detector relay 31 for each of the engines. Each of the EPR limit signals form the EPR limit coomputer 35 and the corresponding output from the EPR sensor 33 are applied as inputs to the corresponding algebraic summing device 37, which in turn provides an input to the corresponding overboost detector 32 and overboost detector relay 31. The output of each of the overboost detector relays 31 is applied to the corresponding independent engine throttle servo. In the independent engine control configuration, the EPR control system 88 of FIG. 8 includes a separate EPR target computer 133 and a corresponding separate algebraic summing device 127 for each of the aircraft engines. The EPR input to each of the algebraic summing devices 127 is provided by the corresponding EPR sensor. The output of each of the algebraic summing devices 127 is applied to the corresponding overboost detector relay 31. The by-pass signal from the non-linear by-pass circuit 129 is applied as an input to each of the algebraic summing devices 127 except that the signal output from the circuit 129 is first divided by the number of engines. Similarly, the $M_{REF}$ signal on the line 77 and the static pressure ratio signal on the line 66 are applied as inputs to each of the EPR target computers 133. The $T_{RQD}$ signal is also applied as an input to each of the EPR target computers 133 except that the signal is first divided by the number of engines so that the $T_{RQD}$ input to each of the computers 133 represents each of the engine's contribution to the total thrust required to be imparted to the aircraft to maintain the reference vertical flight path parameter selected by the vertical flight path parameter selector (vertical speed or flight path angle).

In the embodiment configured for independent engine control, the plural EPR sensors 33 of FIG. 2 apply the plural EPR signals to the thrust computer 69 which utilizes the average value thereof in providing the thrust signal on the line 70.

When the embodiment of the invention is configured for use with a single throttle servo operating through ganged clutches, the EPR sensor 33 of FIG. 2 provides the average EPR value of the multiple engines and the EPR limit computer provides an EPR limit whereby none of the engines will be overboosted. In this embodiment, the average EPR signal is applied to the thrust computer 69 for generation of the thrust signal on the line 70. The average EPR signal is also applied to the EPR control system 88 of FIG. 8 and utilized at the algebraic summing device 127 to provide the signal on the line 89 for driving the single throttle servo.

It is appreciated from the foregoing, that the present invention obtains simultaneous control of vertical speed or flight path angle and airspeed for climb and descent by utilizing the autopilot pitch channel to adjust the airspeed and the autothrottle channel to adjust the vertical speed or flight path angle. The present invention obviates the danger of entering a stall condition or causing the aircraft to lose airspeed when an excessive climb rate or flight path angle is commanded that results in the maximum allowable thrust. Therefore, in comparing the prior art embodiment of FIG. 1 with the embodiment of the present invention of FIG. 2, it is appreciated that in the present invention the $\Delta h$ signal is utilized to control the autothrottle channel 30 rather than the autopilot pitch channel 17 as in the prior art. Additionally, in the embodiment of the present invention the airspeed or Mach command is utilized to control the autopilot pitch channel 17 rather than the autothrottle channel 30 as in the prior art. It is appreciated with respect to FIG. 2, that the thrust reference computer 83 provides a nominal thrust signal on the line 84 for controlling the selected vertical speed or flight path angle. The $\Delta h$ signal on the line 72 provides vernier control of the engine EPR to achieve the selected vertical speed or flight path angle. Although it is appreciated that Mach number and airspeed are different measures of the forward speed of the aircraft, these terms are considered to be equivalent for the purposes of the appended claims.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Vertical flight path and air speed control apparatus for aircraft having an automatic throttle control system for controlling the thrust imparted to said aircraft by the aircraft engines and an automatic flight control system for controlling the aircraft pitch attitude, said apparatus comprising first reference means for providing a first reference signal representative of a reference vertical flight path parameter, second reference means for providing a second reference signal representative of a reference airspeed, thrust reference computer means responsive to said first and second reference signals for providing a thrust reference signal representative of the approximate thrust required by said aircraft to maintain said reference vertical flight path parameter at said reference airspeed, means for providing a first actual value signal representative of the actual value of a vertical flight path parameter, means responsive to said first reference signal and said first actual value signal for providing a vertical flight path parameter error signal proportional to the difference therebetween, and combining means responsive to said thrust reference signal and to said vertical flight path parameter error signal for providing a required thrust signal proportional to the thrust required by said aircraft to maintain said vertical flight path parameter, thereby providing a first command signal to said automatic throttle control system for controlling the thrust imparted to said aircraft in accordance with said first reference signal, and means responsive to said second reference signal for providing a second command signal to said automatic flight control system for controlling the aircraft pitch attitude in accordance with said second reference signal.

2. The apparatus of claim 1 in which said second commanding means comprises means for providing a second actual value signal representative of the actual airspeed of said aircraft, means responsive to said second reference signal and said second actual value signal for providing said second command signal in accordance with the difference therebetween.

3. The apparatus of claim 1 in which said reference vertical flight path parameter comprises aircraft vertical speed.

4. The apparatus of claim 1 in which said reference vertical flight path parameter comprises aircraft flight path angle.

5. The apparatus of claim 1 further including overboost detector means comprising
   means for providing a signal representative of an engine parameter,
   means for providing an engine limit signal representative of a maximum limit value of said engine parameter,
   an overboost detector responsive to said engine parameter signal and said engine limit signal for providing an overboost signal when allowable engine authority is exceeded, and
   decoupling means for decoupling said first command signal from said automatic throttle control system and coupling a signal representative of said engine limit to said automatic throttle control system when said overboost detector detects that the allowable engine authority is exceeded.

6. The apparatus of claim 1 in which
   said first reference means comprises means for providing a vertical speed reference signal and a vertical flight path angle reference signal.

7. The apparatus of claim 6 wherein said
   thrust reference computer means responsive to said flight path angle reference signal and to said second reference signal for providing a thrust reference signal representative of the approximate thrust required by said aircraft to maintain said reference flight path angle at said reference airspeed,
   means for providing a second actual value signal representative of actual aircraft vertical speed,
   means responsive to said vertical speed reference signal and said second actual value signal for providing a vertical speed error signal proportional to the difference therebetween, and
   combining means responsive to said thrust reference signal and to said vertical speed error signal for providing a required thrust signal proportional to the thrust required by said aircraft to maintain said reference vertical speed, thereby providing said first command signal.

8. The apparatus of claim 7 further includes
   integrator means responsive to said vertical speed error signal for providing an integrated value thereof,
   low pass isolation filter means responsive to said vertical speed error signal for removing high frequency noise from said vertical speed error signal, and
   first algebraic summing means coupled to said isolation filter means and said integrator means for providing a thrust adjusting signal.

9. The apparatus of claim 8 in which said combining means comprises second algrebraic summing means responsive to said thrust reference signal and said thrust adjusting signal for providing the algebraic sum thereof, thereby providing said required thrust signal.

10. The apparatus of claim 9 including an engine pressure ratio computer responsive to said required thrust signal for providing a corresponding engine pressure ratio signal, thereby providing said first command signal.

11. The apparatus of claim 10 further including non-linear circuit means for decoupling said thrust adjusting signal from said second summing means and combining said vertical speed error signal with the output of said engine pressure ratio computer whenever said vertical speed error signal exceeds a predetermined magnitude.

12. The apparatus of claim 1 in which said second reference means comprises
   a Mach computer for providing a Mach select signal in accordance with a desired airspeed, a high Mach limit signal in accordance with a maximum airspeed limit and a low Mach limit signal in accordance with a minimum airspeed limit, and
   a mid-value selector circuit responsive to said Mach select signal, said high Mach limit signal and said low Mach limit signal for providing said second reference signal by selecting one signal of said high Mach limit signal, said Mach select signal and said low Mach limit signal having an amplitude level intermediate amplitude levels of the other two signals.

13. The apparatus of claim 12 in which said second reference means further includes a speed program selector for providing an airspeed signal to said Mach computer in accordance with a desired climb schedule.

* * * * *